US011546220B2

(12) United States Patent
Garg et al.

(10) Patent No.: US 11,546,220 B2
(45) Date of Patent: *Jan. 3, 2023

(54) SYSTEMS AND METHODS FOR OPTIMIZING THE NUMBER OF SERVERS IN A CLUSTER (71) Applicant: VMWARE, INC., Palo Alto, CA (US)

(72) Inventors: Rajat Garg, Bangalore (IN); Chandrashekhar Jha, Bangalore (IN); Yash Bhatnagar, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/343,085

(22) Filed: Jun. 9, 2021

(65) Prior Publication Data
US 2021/0297316 A1    Sep. 23, 2021

Related U.S. Application Data (63) Continuation of application No. 16/372,448, filed on Apr. 2, 2019, now Pat. No. 11,038,758.

(30) Foreign Application Priority Data

Jan. 22, 2019  (IN) .............................. 201941002638

(51) Int. Cl.
H04L 41/0893 (2022.01)
H04L 41/0823 (2022.01)

(52) U.S. Cl.
CPC ...... H04L 41/0893 (2013.01); H04L 41/0823 (2013.01)

(58) Field of Classification Search
CPC ...................... H04L 41/0893; H04L 41/0823
See application file for complete search history.

(56) References Cited

U.S. PATENT DOCUMENTS

| 9,658,739 | B1 | 5/2017 | Freund |
| 9,769,124 | B2 | 9/2017 | Yan |
| 2002/0112055 | A1 | 8/2002 | Capers |
| 2005/0154576 | A1 | 7/2005 | Tarui |
| 2009/0150548 | A1 | 6/2009 | Smith |
| 2014/0258536 | A1 | 9/2014 | Chiong |
| 2017/0063973 | A1 | 3/2017 | Chawla |

(Continued)

Primary Examiner — Michael A Keller
Assistant Examiner — Jsing Forng Lin
(74) Attorney, Agent, or Firm — Clayton, McKay & Bailey, PC (57) ABSTRACT Examples described herein include systems and methods for optimizing the number of servers in a cluster. In one example, a number of application servers, a number of backend servers, and a first disk throughput of a backend server to be included in the cluster are determined. The first disk throughput is determined based on the storage capacity of the backend server and a first round trip time. Example systems and method can also include validating the number of application servers based on a cluster throughput and one of a network interface card bandwidth of an application server to be included in the cluster and a load bearing capacity of the application server. The systems and methods can further include determining a second disk throughput of the backend server and increasing the number of backend servers if the second disk throughput is less than the second disk throughput.

20 Claims, 5 Drawing Sheets (56) References Cited

U.S. PATENT DOCUMENTS

2017/0102757 A1* 4/2017 Kang .................. H04L 43/08
2017/0302470 A1 10/2017 Clark
2018/0131633 A1 5/2018 Li
2018/0365044 A1 12/2018 Movsisyan

* cited by examiner

SYSTEMS AND METHODS FOR OPTIMIZING THE NUMBER OF SERVERS IN A CLUSTER

RELATED APPLICATIONS

This application claims priority as a continuation of U.S. application Ser. No. 16/372,448, titled "SYSTEMS AND METHODS FOR OPTIMIZING THE NUMBER OF SERVERS IN A CLUSTER," filed Apr. 2, 2019, which claims benefit under 35 U.S.C. 119(a)-(d) to Foreign application Serial No. 201941002638, filed in India, entitled "SYSTEMS AND METHODS FOR OPTIMIZING THE NUMBER OF SERVERS IN A CLUSTER", on Jan. 22, 2019, by VMware, Inc., both of which are herein incorporated by reference for all purposes.

BACKGROUND

Enterprises have recently shifted many of their computing needs from enterprise owned and operated computer systems to paying third party providers to store and run their applications. These applications can be web applications that run in a data center. A typical data center is composed of numerous racks of servers, switches, routers, and mass data-storage devices. The physical devices that make up a datacenter can be interconnected by local-area networks, wide-area networks, and wireless communications. This allows data center devices to be located at a single facility or distributed geographically over several facilities. Enterprises typically run their web applications in a data center as virtual machines ("VMs") that are consolidated into a virtual data center ("VDC"), also called a software defined data center ("SDDC"). A VDC recreates the architecture and functionality of a physical data center for running an enterprise's web applications.

These VDCs typically host web applications for many different enterprises, with each enterprise being assigned a cluster for its web application by a management server. The architecture for a typical distributed web application provisioned cluster can include at least two layers of servers, the first layer containing application servers and the second layer containing backend servers. Application servers can run a variety of applications, and typically process requests from users and send those requests to backend servers. Backend servers, in turn, can store data that applications need and serve that data to the application servers upon request.

In operation, every application server and backend server in a cluster has a network utilization, central processing unit (CPU) utilization, and disk usage parameter associated with it. These three metrics interact with one another to determine the maximum throughput of the cluster, where throughput is amount of data that can be transferred between application servers and backend servers in the cluster within a given amount of time. Throughput can be measured in, for example, gigabytes per second.

Typically, the number and size of application servers and backend servers needed for deploying a cluster-based web application are based on a rough estimate that assumes network utilization, CPU utilization, and disk usage of the servers in the cluster are at a maximum, which corresponds to a peak load condition. A peak load condition represents the highest load the cluster can bear at any given time. During the majority of its operational time, however, a cluster does not operate at a peak load condition. Accordingly, most of the cluster is under-utilized for much of the time, and the typical cluster can be said to be overprovisioned because it has too many application servers or backend servers. This results in increased VDC operational costs and loss of available energy, which leads to problems such as increased boot time, longer snapshot time, difficult migration mobility, and the like.

As a result, a need exists for systems and methods for optimizing the number of servers in a cluster and decreasing virtual data center operational costs and loss of available energy.

SUMMARY

Examples described herein include systems and methods for optimizing the number of servers in a cluster. An example method includes determining a number of application servers and a number of backend servers for inclusion in the cluster. The method can further include determining a first disk throughput of a backend server to be included in the cluster. The disk throughput can be determined based on the storage capacity of the backend server and a first round trip time. The method can also include validating the number of application servers based on a cluster throughput, a network interface card bandwidth of an application server, and a load bearing capacity of the application server. The method can further include determining a second disk throughput of the backend server. The method can also include increasing the number of backend servers if the second disk throughput is less than the second disk throughput.

In one example, validating the number of application servers can also include increasing the number of application servers. Determining the second disk throughput can further include provisioning each of a plurality of servers as an application server or a backend server based on the increased number of application servers and the number of backend servers. The system can also determine the second disk throughput can by measuring a second round trip time to process a request. For example, the system can measure the round trip time between a provisioned application server and a provisioned backend server.

In one example, the system can base the number of backend servers on a storage requirement of a web application. Other factors can also be used, such as a storage capacity of an individual backend server to be included in the cluster.

In one example, the number of application servers in the cluster can be determined based on a request load associated with a web application that will run on the cluster and the load bearing capacity of an individual application server to be included in the cluster.

The examples summarized above can each be incorporated into a non-transitory, computer-readable medium having instructions that, when executed by a processor associated with a computing device, cause the processor to perform the stages described. Additionally, the example methods summarized above can each be implemented in a system including, for example, a memory storage and a computing device having a processor that executes instructions to carry out the stages described.

Both the foregoing general description and the following detailed description are exemplary and explanatory only and are not restrictive of the examples, as claimed.

DESCRIPTION OF THE EXAMPLES

Reference will now be made in detail to the present examples, including examples illustrated in the accompanying drawings. Wherever possible, the same reference numbers will be used throughout the drawings to refer to the same or like parts.

Examples described herein include systems and methods for optimizing the number of servers in a cluster. In one example, a management server executes a cluster configurer process for optimizing server clusters in a data center. The management server can determine a number of application servers, a number of backend servers, and a first disk throughput of a backend server for inclusion in the cluster. The first disk throughput can be determined based on the storage capacity of the backend server and a first round trip time. The management server can also validate the number of application servers based on cluster throughput and another factor. For example, the additional factor can include bandwidth of a network interface card or a load-bearing capacity of the application server. In one example, the management server can determine a second disk throughput of the backend server. The cluster configurer can increase the number of backend servers if the second disk throughput is less than the second disk throughput.

Figure 1:
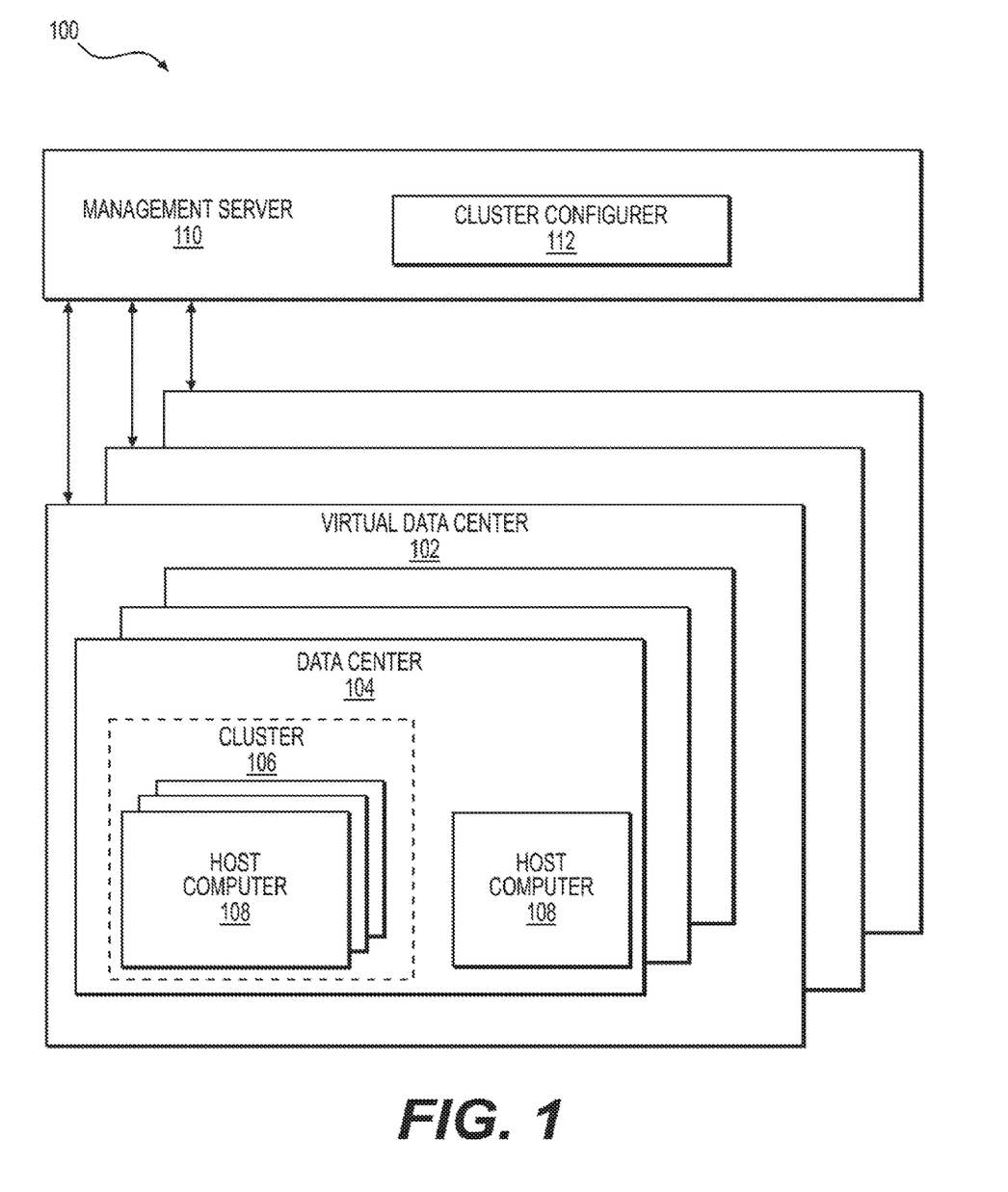
FIG. 1 is an exemplary block diagram of a virtualized computer system.
Figure 2:
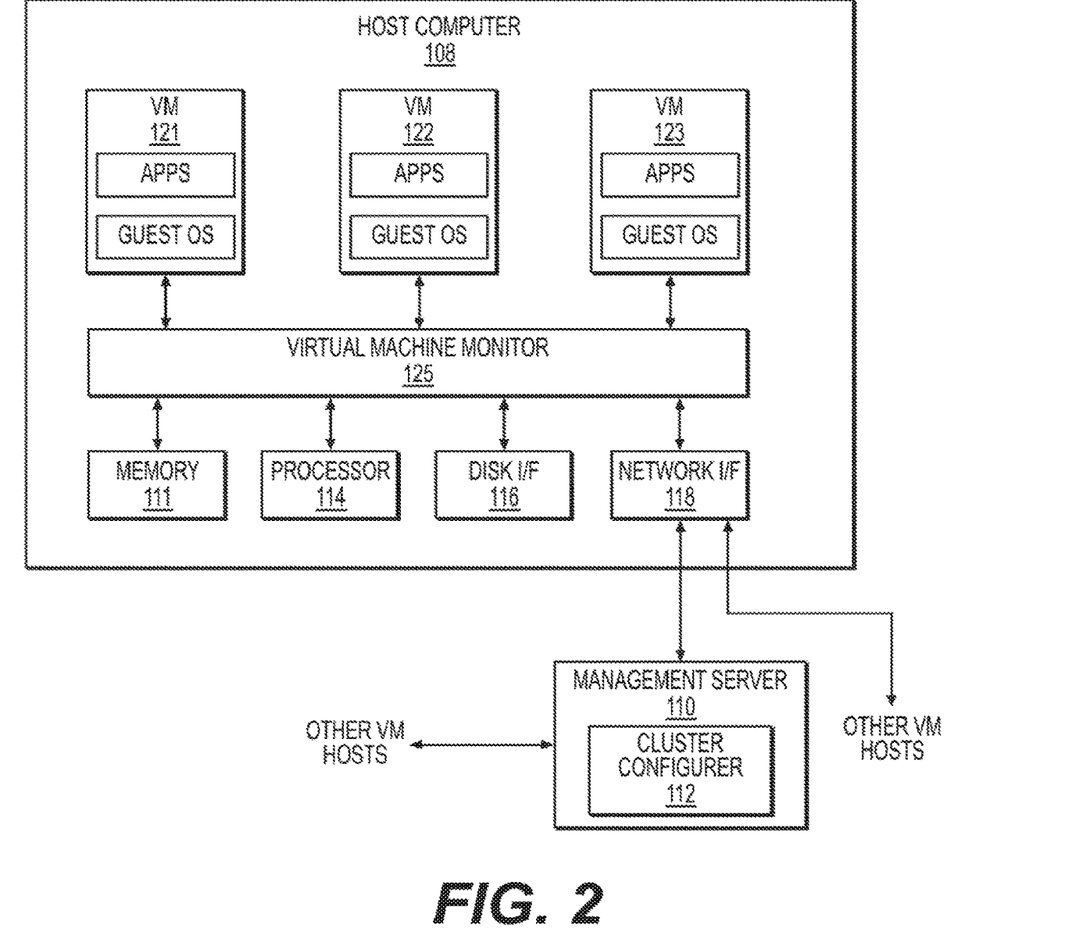
FIG. 2 is an exemplary block diagram of the host computer and the management server of FIG. 1.
Figure 3:
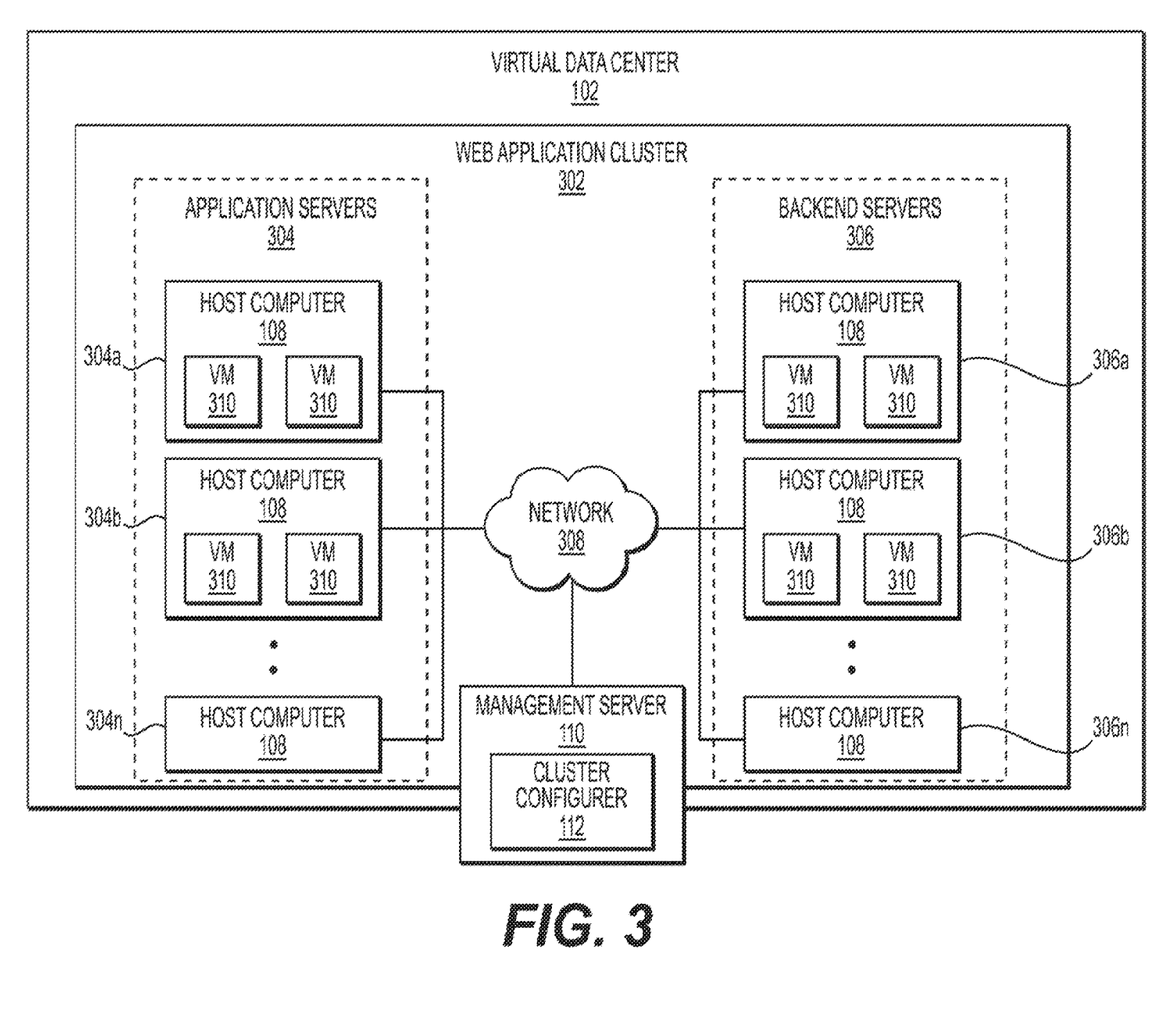
FIG. 3 is an exemplary block diagram of a computing environment in which one or more embodiments of the present disclosure can be used.
Figure 4:
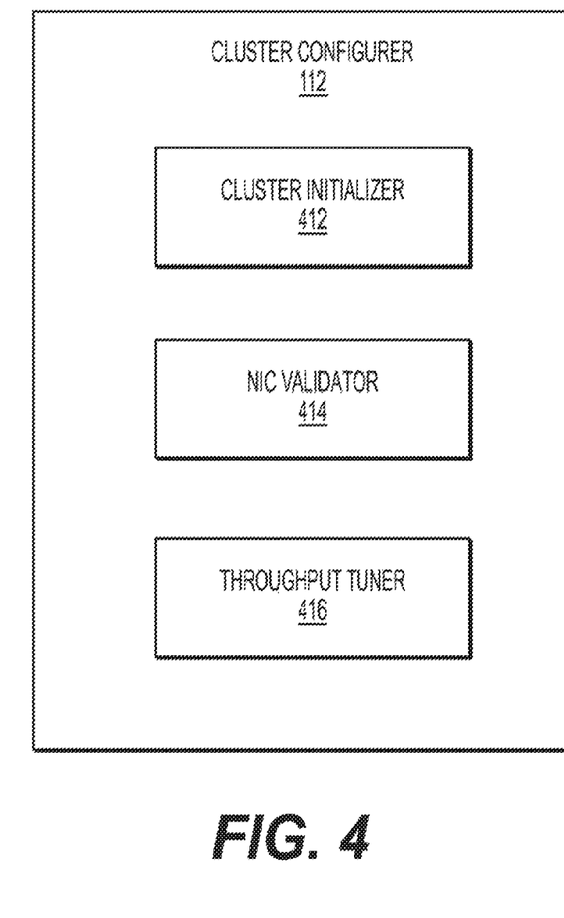
FIG. 4 is an exemplary block diagram of a system for optimizing the number of servers in a cluster.
Figure 5:
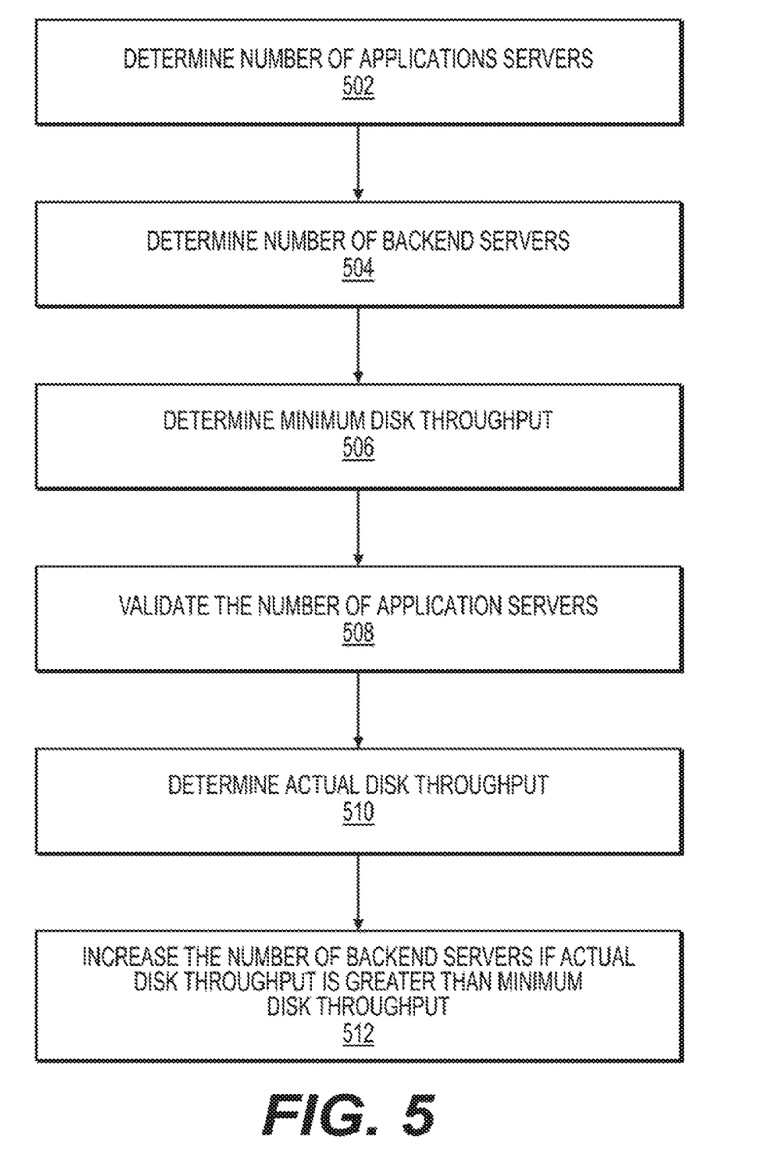
FIG. 5 is a flowchart of an exemplary method for optimizing the number of servers in a cluster.

FIGS. 1-3 provide illustrations of exemplary computing environments in which one or more embodiments of the present disclosure can be used, with FIG. 1 illustrating an exemplary virtualized computer system. FIG. 2 further illustrates the exemplary host computer and management server of FIG. 1. FIG. 3 illustrates an exemplary virtual data center, and FIG. 4 provides an illustration of an exemplary system for optimizing the number of servers in a cluster. FIG. 5 provides an illustration of an exemplary method for optimizing the number of servers in a cluster.

Turning to FIG. 1, an illustration of an exemplary virtualized computer system 100 is shown. The system 100 can include one or more virtual data centers 102 and a management server 110. In some cases, the system 100 can span a distributed cloud network, with the virtual data centers 102 located at different locations in the cloud. Host computers 108 (also referred to as "servers") are configured to provide virtualization-based distributed services, such as providing distributed web applications to remote environments and user devices. Computing resources of a host computer 108 can be shared between virtual services in a virtualization layer. The virtualization layer can abstract processor, memory, storage, and networking resources into multiple virtual machines that run on the same physical host computer. Virtualization software can be installed directly on the server hardware to provide the virtualization layer, which can execute between the hardware and the operating system. In one example, the virtualization software partitions a physical host computer into multiple secure and portable virtual machines. A virtual machine can represent a complete system—with one or more virtual processors and virtualized memory, networking, storage, and BIOS.

The host computers 108 can be organized into a cluster 106. One or more clusters 106 and the host computers 108 can then be organized into a data center 104. One or more data centers 104 can be organized into a virtual data center 102. One or more virtual data centers 102 can be organized into the virtualized computer system 100. The one or more virtual data centers 102, and ultimately the included host computers 108, can be managed via the management server 110. The management server 110 can manage the virtual infrastructure, including managing the host computers 108 and the virtual machines running within each host computer 108. Management server 110 can, for example, configure, provision, and manage the host computers 108 and the virtual machines running within each host computer 108 (operating as application servers or backend servers for a given enterprise). One management server 110 can be provided for a plurality of virtual data centers 102. Alternatively, one management server can be provided for each virtual data center 102. Further, management server 110 can include one or more servers, processors, memories, and computing devices. In some examples, the management server 110 is a network of servers, some of which can be located remotely from one another. In another example, the management server 110 is a single server with multiple purposes, and can be, for instance, a host computer 108. In yet another example, the management server 110 can be one or more servers dedicated to the operations described herein.

Each virtual data center 102 can be configured to host one or more web applications. Each web application can run on a cluster 106 having at least two layers of servers. A first layer can contain application servers and a second layer can contain backend servers. A virtual data center 102, as will be described below, can include multiple virtual machines organized into an application server layer and a backend server layer. The application server layer contains one or more application servers that can run a variety of applications, in an example. These application servers can process requests from users and send those requests to the backend server layer. The backend server layer includes one or more backend servers, in an example. The backend servers can store data that the applications need and serve that data to the application servers upon request.

The management server 110 can execute a cluster configurer 112, which configures, provisions, and manages the host computers 108 and the virtual machines running within each host computer 108, in an example. The virtual machines can operate as application servers or backend servers for a web application. The cluster configure 112 can ensure that the overall number of application servers and backend servers in a cluster are optimized. The manner in which the cluster configurer 112 determines how to optimize the number of application servers and backend servers will be described in greater detail below with reference to FIG. 4.

The management operations of the management server 110 can be performed via a client application (not shown). For example, configuration tasks, such as configuring storage and network connections or managing the service console, can be accomplished centrally through the client application. One example provides a stand-alone application version of the client application. In another example, the client application is implemented as a web browser application that provides management access from any networked device.

The management server 110 can include one or more processors that execute instructions in a non-transitory, computer-readable medium. This can cause the management server 110 to run the cluster configurer 112, which can execute as a process. The cluster configure 112 can communicate with the virtual data center 102 to optimize the numbers of application and backend servers provided by the virtual machines.

FIG. 2 shows a block diagram of one exemplary host computer 108 and an exemplary management server 110 shown FIG. 1. As described above with respect to FIG. 1, the virtualized environment 100 includes the host computers 108, each of which can include physical hardware components of a computing device. The virtualized environment 100 can be implemented as part of a cluster of computing devices that runs a web application. One or more virtual machines are configured within each host computer 108, represented in FIG. 2 as VM 121, VM 122, and VM 123. The VMs 121, 122, 123 share hardware resources of the host computer 108, such as a system memory 111, a processor 114, a disk interface 116, and a network interface 118. The system memory 111, which can be random access memory (RAM), is the primary memory of the host computer. The processor can be any type of processor, such as a central processing unit (CPU) commonly found in a server and can be one or more of such processors. Examples of the disk interface 116 are a host bus adapter and a network file system interface. The disk interface 116 can provide access to one or mass storage devices (not shown) for storing software and/or data. Examples of such mass storage devices include flash devices, floppy disk drives, hard drive disks, solid state disks (SSDs), optical compact disk (CD) drives, optical Blu-ray disk drives, RAID systems, and optical digital versatile disk (DVD) drives. An example of the network interface 118 is a network adapter, also referred to as a Network Interface Card (NIC). In some examples, a plurality of NICs is included in the network interface 118. The management server 110 can be communicatively coupled to the host computer 108 of FIG. 2 via the network interface 118, and other host computers 108 can also couple to the host computer 108 of FIG. 2 via network interface 118. In this manner, data and instructions can be transferred between the host computer 108 of FIG. 2 and management server 110 or other host computers 108 over the network interface 118.

The virtual machines VM 121-123 execute on top of a virtual machine monitor 125. The virtual machine monitor 125 can be a software interface layer that enables sharing of the hardware resources of the host computer 108 by the virtual machines. The virtual machine monitor 125 can execute on top of the operating system of the host computer 108 or directly on hardware components of the host computer 108. In some embodiments, the virtual machine monitor 125 runs on top of a hypervisor that is installed on top of the hardware resources of the host computer 108. Together, the virtual machines 121-123 and the virtual machine monitor 125 create virtualized computer systems that give the appearance of being distinct from the host computer 108 and from each other. Each virtual machine 121-123 can include a guest operating system and one or more guest applications, in an example. The guest operating system is a master control program of the virtual machine and, among other things, the guest operating system forms a software platform on top of which the guest applications run.

FIG. 3 depicts an exemplary virtual data center 102 including a web application cluster 302 for executing a web application. A web application, as used herein, refers to, generally, a collection of multiple software components that are concurrently executed in a coordinated manner. A web application can refer to a distributed application, configured to execute on one or more host computers or 108 or virtual machines 310, and can require at least two layers of servers on which to execute, such as application server layer 304 and backend server layer 306 of web application cluster 302. The application server layer 304 can execute an application across a number of application servers 304a, 304b, . . . 304n (where n is a positive integer). The application server layer 304 can processes requests from users of client machines (not shown). The requests can be sent to web servers (not shown) and then routed through a load balancer (not shown) to one of application servers 304a, 304b, . . . 304n. Application servers 304a, 304b, . . . 304n ultimately send the processed requests to the backend server layer 306. Backend server layer 306 can be comprised of a number of backend servers 306a, 306b, . . . 306n (where n is a positive integer), which can, in turn, store data that the application needs and serve that data to application servers 304a, 304b, . . . 304n upon receiving the request. A virtual machine (VM) 310 associated with the application layer 304 or a host computer 108 associated with the application layer 304 can constitute an application server 304a, 304b, . . . or 304n, depending on the level of virtualization (i.e., no virtualization, partial virtualization, or total virtualization) of the cluster. Similarly, a virtual machine (VM) 310 associated with the backend server layer 306 or a host computer 108 associated with the backend server layer 306 can constitute a backend server 306a, 306b, . . . or 306n, depending on the level of virtualization (i.e., no virtualization, partial virtualization, or total virtualization) of the cluster.

One example of a web application is a finance application, such as an application used to access a bank account, through which a user of a client device (not shown) requests to view the account's balance. The web application in this example includes a financial software component configured to operate on application server layer 304 in a coordinated manner and a database component configured to operate on backend server layer 306 in a coordinated manner. VMs 310 associated with the application server layer 304 execute the financial software component of the web application and are thus each application servers in operation. VMs 310 associated with backend server layer 306 execute the databased component and are thus each backend servers in operation.

In this example, when a user of a client device requests to view an account's balance, the client device generates a hyper-text transfer protocol (HTTP) request that triggers an SQL query with input values of at least the account number of the user. A uniform resource locator (URL) field in the HTTP request includes the account number and the requested action. An application server 304a, 304b, or . . . 304n processes the incoming HTTP request and forwards the SQL query to one of the backend servers 306a, 306b, or . . . 306n that maintains the user's account balance. The backend server 306a, 306b, or . . . 306n executes the SQL query generated in response to the HTTP request, and thereafter replies to the application server 304a, 304b, or . . . 304n with the balance value, which is ultimately presented to the user using a web server (not shown).

Application servers 304a, 304b, . . . 304n and backend servers 306a, 306b, . . . 306n included in web application cluster 302 communicate data and instructions to and from each other and management server 310 over network 308. Network 308 can be any type of computer network or combination of networks that allows communications between devices connected to the network. The network 308 can include the internet, a wide area network (WAN), a local area network (LAN), a storage area network (SAN), a fiber channel network and/or other networks.

Management server 110 can configure, provision, and manage the host computers 108 and the virtual machines 310 running within each host computer 108. In one example, the management sever can cause the virtual machines 310 to operate as application servers 304a, 304b, . . . 304n or backend servers 306a, 306b, . . . 306n for the web application executing on web application cluster 302. In one example, the management server 110 includes cluster configurer 112, which can determine the number of application servers 304a, 304b, . . . 304n and backend servers 306a, 306b, . . . 306n needed in web application cluster 302 to optimize the number of servers in the cluster 302. The manner in which cluster configurer 112 determines and optimizes the number of application servers 304a, 304b, . . . 304n and backend servers 306a, 306b, . . . 306n will be discussed below in greater detail with reference to FIG. 4.

FIG. 4 illustrates an exemplary cluster configurer 112 for optimizing the number of application servers and backend servers in a web application cluster running a web application. As illustrated in FIG. 4, the cluster configurer 112 can include various processes that execute as part of the cluster configurer 112 or communicate with the cluster configure 112. These processes can include a cluster initializer 412, a NIC validator 414, and a throughput tuner 416, which are described in detail below. In an example, the cluster configurer 112 is implemented as software running on management server 110. The management server 110 can include a non-transitory, computer-readable medium containing instructions that are executed by the processor. Those instructions can include instructions for performing the functionality of cluster configurer 112. Example non-transitory, computer-readable mediums include RAM and ROM, disks, and other memory and storage that is accessible by a USB port, a floppy drive, CD-ROM, or DVD-ROM drive, and a flash drive, among others. However, the cluster configurer 112 can be implemented in any combination of hardware and software.

In order to determine the optimal number of application servers 304a, 304b, . . . 304n and backend servers 306a, 306b, . . . 306n in web application cluster 302 for a given web application, cluster configurer 112 can receive parameters associated with the web application and parameters associated with host computers 108 or the virtual machines 310 running on the host computers 108. The cluster configurer 112 can receive these parameters from the management server 110, which can in turn receive these parameters from a user, or, alternatively, retrieve the parameters from the web application. For example, an installation package that includes the web application may also include a separate data file that specifies the parameter information.

The parameters associated with the web application can include the desired round-trip time (RTT) for web application requests, the storage requirement for the web application, the throughput limit for the web application (also referred to herein as the cluster throughput), and the request load for the web application. The desired RTT can be the maximum total time an enterprise would like it to take to (1) send a request from an application server to a backend server; (2) process the request by the backend server and retrieve data stored in the backend server responsive to the request; and (3) return the retrieved data from the backend server to the application server. The desired RTT can be measured in seconds.

The storage requirement (S) for the web application can be the total number of data objects required by the application multiplied by the average object size and the replication factor. In one example, the replication factor is determined by how many copies of the required data objects are desired to be stored in the cluster concurrently. The storage requirement can be measured in giga- or tera-bytes.

The throughput limit, or cluster throughput, can be the number of requests per second anticipated by the web application multiplied by the average data size of the request. The throughput limit can be measured in giga- or tera-bytes per second. The request load for the web application is the total number of requests expected by the application per second, in an example.

The parameters associated with the host computers 108 and the virtual machines 310 can include the network interface (NIC) bandwidth of an individual host computer 108 or individual virtual machine 310 running on a host computer 108. The parameters can further include the load bearing capacity of an individual host computer 108 or an individual virtual machine 310 that can be included in the cluster as an application server. Another parameter, in an example, is the disk space (also referred to as storage capacity) of an individual host computer 108 or virtual machine 310 that can be included in the cluster as backend server. NIC bandwidth is the amount of data that can be transferred from an application server over the network interface 118 to a backend server within a given time period. NIC bandwidth can be measured in gigabytes per second and can be provided in the hardware specifications of host computer 108 or virtual machine 310 running within host computer 108. Load-bearing capacity can be the number of requests per second a host computer 108 or virtual machine 310. Load-bearing capacity can be directly proportional to the RAM and the processor frequency of the host computer 108 or virtual machine 310 running within host computer 108. Load-bearing capacity is measured in gigabytes per second. Disk space or storage capacity of a host computer 108 or virtual machine 310 running within host computer 108 can include the amount of mass storage available to the host computer 108 or virtual machine 310. Disk space or storage capacity is measured in giga- or tera-bytes.

To optimize the number of application and backend servers, cluster configurer 112, via cluster initializer 412, can determine a number of application servers for inclusion in the cluster, a number of backend servers for inclusion in the cluster, and a maximum disk throughput of an individual backend server to be included in the cluster. In one example, cluster initializer 412 can determine the number of application servers for inclusion in the cluster by dividing the request load of the web application by the load bearing capacity of an individual application server to be included in the cluster. Cluster initializer 412 can determine the number of backend servers for inclusion in the cluster by dividing the storage requirement of the web application by the storage capacity of an individual backend server to be included in the cluster. Cluster initializer 412 can determine the maximum disk throughput of an individual backend server to be included in the cluster by multiplying the storage capacity of the individual backend server by a constant k and dividing the result by the desired round-trip time. Disk throughput of a backend server can include the amount of data that can be transferred from a backend server to an application server within a given amount of time, such as the desired round-trip time. The majority of the round trip time will be taken up by the backend server performing a disk seek, which is the time it takes for the disk comprising the mass storage of host computer 108 or of virtual machine 310 running within a host computer 108 to move its head to the correct physical location to read or write data in response to a command from disk interface 116. The constant k can therefore be assumed to be nearly equal to one, in an example.

Once cluster initializer 412 determines the number of application servers, backend servers, and maximum disk throughput, cluster configurer 112, through NIC validator 414, can validate the number of application servers. This can ensure that the request load can be handled by that number of applications servers. The number of application servers can also be based on load bearing capacity or NIC bandwidth, each of which can indicate an existing bottleneck. Accordingly, NIC validator 414 can take the cluster throughput and divide it by the lesser of the application server's load bearing capacity and its NIC bandwidth to validate the number of application servers. In some cases, this validation results in the NIC validator 414 increasing the number of application servers included in the cluster. In other cases, this validation results in the number of application servers included in the cluster remaining the same as the number of application servers determined by cluster initializer 412.

Cluster configurer 112, through throughput tuner 416, can then determine the actual disk throughput of a backend server to be included in the cluster. Throughput tuner 416 can determine the actual disk throughput of such a backend server by causing management server 110 to provision a number of application servers and a number of host servers. These can be provisioned from the host computers 108 or virtual machines 310 running on the host computers 108. The number of host computers 108 and/or virtual machines 310 that are provisioned to be application servers can be equal to the number of application servers resulting from NIC validator 414's validation. The number of host computers 108 and/or virtual machines 310 that are provisioned to be backend servers is equal to the number of backend servers initially determined by cluster initializer 412.

Throughput tuner 416 can then run the web application on the provisioned application servers and backend servers, with data center developers simulating various request loads on the application servers. Throughput tuner 416 can measure the actual round-trip time for requests sent from an application server to a backend server for the various request loads. The throughput tuner 416 can also use the measured round-trip time to determine the actual disk throughput of an individual backend server. Throughput tuner 416 determines the actual disk throughput by multiplying the storage capacity of the individual backend server by a constant k, which is again nearly equal to one, and dividing the result by the measured round-trip time.

In one example, throughput tuner 416 then compares the maximum disk throughput determined by cluster initializer 412 with the actual disk throughput determined by throughput tuner 416. Throughput tuner 416 can increase the number of backend servers to be included in the cluster if the actual disk throughput is less than the maximum disk throughput. Cluster configurer 112 can then cause the management server 110 to provision additional host computers 108 or virtual machines to be backend servers. In one example, the cluster configurer 112 can specify that the number of backend servers be increased to the increased number of backend servers provided by throughput tuner 416.

In some examples, this results in an optimized number of application servers and backend servers. For instance, throughput tuner 416 can again determine the actual disk throughput time of a backend server after the number of backend servers has been increased and provisioned accordingly. If the determined disk throughput time is not less than the maximum disk throughput time, the number of backend servers will not be increased further, and the number of application servers and backend servers can be said to be optimized. In other examples, throughput tuner 416 repeats its determination of the actual disk throughput of a backend server and its increase of the number of backend servers until the actual disk throughput is not less than the maximum disk throughput, and cluster configurer 112 provisions additional host computers 108 or virtual machine 310 to be backend servers. This can bring the total number of backend servers included in the cluster equal to the increased number of backend servers provided by throughput tuner 416. At this point, the number of application servers and backend servers can be said to be optimized.

FIG. 5 depicts an example method for optimizing the number of application servers and backend servers in a cluster, using the components described in FIG. 4. At stage 502, cluster configurer 112 can use, via cluster initializer 412 to determine the number of application servers to be included in the cluster. Cluster initializer 412 can determine the number of application servers for inclusion in the cluster by dividing the request load of the web application by the load bearing capacity of an individual application server to be included in the cluster. A host computer 108 or a virtual machine 310 running within host computer 108 can constitute an application server to be included in the cluster, depending on the level of virtualization in the cluster. In one example, the management server 110 can provide the request load to cluster configurer 112 as a predetermined parameter, as described above with respect to FIG. 4.

At stage 504, cluster configurer 112 can use cluster initializer 412 to determine the number of backend servers for inclusion in the cluster. To do this, cluster initializer 412 can divide the storage requirement of the web application by the storage capacity of an individual backend server. A host computer 108 or a virtual machine 310 running within host computer 108 can constitute a backend server to be included in the cluster, depending on the level of virtualization in the cluster. The storage requirement of the web application and the storage capacity of a backend server can be predetermined parameters provided to cluster configurer 112 by management server 110, as described above with respect to FIG. 4.

At stage 506, cluster configurer 112 can use cluster initializer 412 to determine the maximum disk throughput of a backend server to be included in the cluster. Cluster initializer 412 can do this by multiplying the storage capacity of the individual backend server by a constant k. Constant k can be a value nearly equal to one, in an example. Then, the cluster configure 112 can divide the result by the desired round-trip time. The storage capacity of a backend server and desired round-trip time are predetermined parameters provided to cluster configurer by management server 110 as described above with respect to FIG. 4.

At stage 508, cluster configurer 112 can use NIC validator 414 to validate the number of application servers determined by cluster initializer 412. This can ensure that the request load can be handled by that number of applications servers. This validation process can include dividing the cluster throughput by the lesser of the application server's load-bearing capacity and its NIC bandwidth. The cluster throughput, the application server's load bearing capacity, and the application server's NIC bandwidth can be predetermined parameters provided to cluster configurer 112 by management server 110, in an example. For example, this is described above with respect to FIG. 4. Based on the validation results, the NIC validator 414 can increase the number of application servers to be included in the cluster. In other cases, this validation results in the number of application servers to be included in the cluster remaining the same as the number of application servers determined by cluster initializer 412.

At stage 510, cluster configurer 112 can use throughput tuner 416 to determine the actual disk throughput of a backend server to be included in the cluster. Throughput tuner 416 can determine the actual disk throughput of such a backend server, in an example. To do this, throughput tuner 416 can cause management server 110 to provision application servers and backend servers. The number of host computers 108 or virtual machines 310 that are provisioned to be application servers can be set to equal to the number of application servers resulting from NIC validator 414's validation. The number of host computers 108 or virtual machines 310 that are provisioned to be backend servers can be set to equal to the number of backend servers initially determined by cluster initializer 412.

Throughput tuner 416 can then run the web application on the provisioned application servers and backend servers, in an example. Data center test modules can simulate various request loads on the application servers. Throughput tuner 416 can measure the actual round-trip time for requests sent from an application server to a backend server for the various request loads. Throughput tuner 416 can use the measured round-trip time to determine the actual disk throughput of an individual backend server.

In one example, throughput tuner 416 can determine the actual disk throughput by multiplying the storage capacity of the individual backend server by a constant k. This constant can be nearly equal to one. Then, throughput tuner 416 can divide the result by the measured round-trip time. Throughput tuner 416 can then compare the maximum disk throughput determined by cluster initializer 412 with the actual disk throughput determined by throughput tuner 416.

At stage 512, cluster configurer 112, via throughput tuner 416 increases the number of backend servers to be included in the cluster if the actual disk throughput is less than the maximum disk throughput, in an example. Cluster configurer 112 can then cause management server 110 to provision additional host computers 108 or virtual machines 310 as backend servers so that the total number of backend servers equals the increased number of backend servers provided by throughput tuner 416. In some examples, this results in an optimized number of application servers and backend servers.

After increasing the number of backend servers, throughput tuner 416 can verify the optimization in an example. This can include again determining the actual disk throughput time of a backend server. If the determined disk throughput time is not less than the maximum disk throughput time, the number of backend servers will not be increased further. The system can treat the number of application servers and backend servers as optimized. In other examples, throughput tuner 416 repeats its determination of the actual disk throughput of a backend server and its increase of the number of backend servers until the actual disk throughput is not less than the maximum disk throughput. Cluster configurer 112 can provision additional host computers 108 or virtual machines 310 to be backend servers. In one example, cluster configure 112 can increase the total number of backend servers until they equal the increased number of backend servers provided by throughput tuner 416. At this point, the number of application servers and backend servers can be said to be optimized.

Other examples of the disclosure will be apparent to those skilled in the art from consideration of the specification and practice of the examples disclosed herein. Though some of the described methods have been presented as a series of stages, it should be appreciated that one or more stages can occur simultaneously, in an overlapping fashion, or in a different order. The order of stages presented are only illustrative of the possibilities and those stages can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the disclosure being indicated by the following claims.

What is claimed is:

1. A method for optimizing the number of servers in a cluster, the stages of the method comprising:
   determining a number of application servers for inclusion in a cluster based on a throughput requirement for a web application;
   determining a number of backend servers for inclusion in the cluster based on a storage requirement of the web application;
   increasing the number of application servers based on a network interface card (NIC) bandwidth of one of the application servers; and
   provisioning, in the cluster, the increased number of application servers and the number of backend servers.

2. The method of claim 1, further comprising:
   determining an actual disk throughput for at least one of the provisioned backend servers; and
   when the actual disk throughput is less than an amount of throughput from the provisioned application servers, increasing the number of backend servers provisioned in the cluster.

3. The method of claim 2, wherein determining the actual disk throughput includes measuring a round trip time to process a request between one of the provisioned as application servers and one of the provisioned backend servers.

4. The method of claim 1, further comprising:
   determining an actual round-trip time for a request sent from a provisioned application server to a provisioned backend server; and
   when the actual round-trip time is more than a round-trip time requirement for the web application, increasing the number of backend servers provisioned in the cluster.

5. The method of claim 1, wherein the increasing of the number of application servers occurs when a cluster throughput is divided by the NIC bandwidth and results in a number that is greater than the determined number of application servers.

6. The method of claim 1, wherein the number of backend servers is further determined based on a storage capacity of a backend server.

7. The method of claim 1, further comprising repeatedly increasing the number of backend servers until an actual disk throughput is not less than a maximum disk throughput of one of the provisioned backend servers.

8. A non-transitory, computer-readable medium containing instructions that, when executed by a hardware-based processor, cause the processor to perform stages for optimizing the number of servers in a cluster, the stages comprising:

determining a number of application servers for inclusion in a cluster based on a throughput requirement for a web application;

determining a number of backend servers for inclusion in the cluster based on a storage requirement of the web application;

increasing the determined number of application servers based on a network interface card (NIC) bandwidth of one of the application servers; and provisioning, in the cluster, the increased number of application servers and the number of backend servers.

9. The non-transitory, computer-readable medium of claim 8, the stages further comprising:

determining an actual disk throughput for at least one of the provisioned backend servers; and when the actual disk throughput is less than an amount of throughput from the provisioned application servers, increasing the number of backend servers provisioned in the cluster.

10. The non-transitory, computer-readable medium of claim 9, wherein determining the actual disk throughput includes measuring a round trip time to process a request between one of the provisioned as application servers and one of the provisioned backend servers.

11. The non-transitory, computer-readable medium of claim 8, the stages further comprising:

determining an actual round-trip time for a request sent from a provisioned application server to a provisioned backend server; and when the actual round-trip time is more than a round-trip time requirement for the web application, increasing the number of backend servers provisioned in the cluster.

12. The non-transitory, computer-readable medium of claim 8, wherein the increasing of the number of application servers occurs when a cluster throughput is divided by the NIC bandwidth and results in a number that is greater than the determined number of application servers.

13. The non-transitory, computer-readable medium of claim 8, wherein the number of backend servers is further determined based on a storage capacity of a backend server.

14. The non-transitory, computer-readable medium of claim 8, the stages further comprising repeatedly increasing the number of backend servers until an actual disk throughput is not less than a maximum disk throughput of one of the provisioned backend servers.

15. A system for optimizing the number of servers in a cluster, comprising:

a memory storage including a non-transitory, computer-readable medium comprising instructions; and a computing device including a processor that executes the instructions to carry out stages comprising:

determining a number of application servers for inclusion in a cluster based on a throughput requirement for a web application;

determining a number of backend servers for inclusion in the cluster based on a storage requirement of the web application;

increasing the number of application servers based on a network interface card (NIC) bandwidth of a provisioned application server; and provisioning, in the cluster, the increased number of application servers and the number of backend servers.

16. The system of claim 15, the stages further comprising:

determining an actual disk throughput for at least one of the provisioned backend servers; and when the actual disk throughput is less than an amount of throughput from the provisioned application servers, increasing the number of backend servers provisioned in the cluster.

17. The system of claim 16, wherein determining the actual disk throughput includes measuring a round trip time to process a request between one of the provisioned as application servers and one of the provisioned backend servers.

18. The system of claim 15, the stages further comprising:

determining an actual round-trip time for a request sent from a provisioned application server to a provisioned backend server; and when the actual round-trip time is more than a round-trip time requirement for the web application, increasing the number of backend servers provisioned in the cluster.

19. The system of claim 15, wherein the increasing of the number of application servers occurs when a cluster throughput is divided by the NIC bandwidth and results in a number that is greater than the determined number of application servers.

20. The non-transitory, computer-readable medium of claim 8, wherein the number of backend servers is further determined based on a storage capacity of a backend server.

* * * * *